US012693948B2

(12) United States Patent
Behrens et al.

(10) Patent No.: US 12,693,948 B2
(45) Date of Patent: *Jul. 28, 2026

(54) INCREASED REPLICATION FOR MANAGED VOLUMES

(71) Applicant: SAP SE, Walldorf (DE)

(72) Inventors: Markus Behrens, Berlin (DE); Reiner Singer, Schriesheim (DE); Werner Thesing, Lautertal (DE); Yue Zhu, Heidelberg (DE); Mitja Kleider, Heidelberg (DE); Omran Saleh, Wiesloch (DE); Timo Sulg, Frankfurt (DE); Marcel Birn, Stuttgart (DE); Christoph Roterring, Sinsheim (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 19/091,105

(22) Filed: Mar. 26, 2025

(65) Prior Publication Data

US 2025/0225040 A1      Jul. 10, 2025

Related U.S. Application Data

(63) Continuation of application No. 18/228,395, filed on Jul. 31, 2023, now Pat. No. 12,332,754.

(51) Int. Cl.
*G06F 11/00*        (2006.01)
*G06F 11/16*        (2006.01)
*G06F 11/20*        (2006.01)

(52) U.S. Cl.
CPC ...... *G06F 11/2041* (2013.01); *G06F 11/1612* (2013.01); *G06F 11/2082* (2013.01)

(58) Field of Classification Search
CPC ............. G06F 11/2041; G06F 11/1612; G06F 11/2082
See application file for complete search history.

(56) References Cited

U.S. PATENT DOCUMENTS

| | | | |
|---|---|---|---|
| 9,804,935 B1 | 10/2017 | Holenstein et al. | |
| 10,002,247 B2 | 6/2018 | Suarez et al. | |

(Continued)

FOREIGN PATENT DOCUMENTS

| | | |
|---|---|---|
| EP | 4083786 | 11/2022 |

OTHER PUBLICATIONS

"SAP HANA System Replication", SAP HANA Platform 2.0 SPS 04. Document version 1.1-2019-10-31, (Oct. 31, 2019), 286 pgs.

(Continued)

*Primary Examiner* — Jason B Bryan
(74) *Attorney, Agent, or Firm* — SCHWEGMAN LUNDBERG & WOESSNER, P.A.

(57)        ABSTRACT

A scale-out computing cluster may include a large number of computing servers and storage devices. In order to provide high reliability, the computing cluster must be able to handle failures of individual devices. Reliability of the computing cluster may be improved by providing a standby server for each active server in the computing cluster. If any active server fails, the corresponding standby server is activated. The failed server may be brought back online or replaced, at which time the restored server becomes the standby server for the now-active original standby server. During the restoration period, if any other active server fails, the standby server for that active server is immediately activated. As a result, the recovery ability of the computing cluster is only challenged if both servers of an active/standby pair fail during the restoration period, substantially improving reliability.

20 Claims, 9 Drawing Sheets

┌─ 700

710 ─
DETECT A FAILURE OF ONE OF A PLURALITY OF ACTIVE INDEX SERVERS, EACH ACTIVE INDEX SERVER ACCESSING DATA FROM A CORRESPONDING FIRST SET OF VOLUMES, EACH ACTIVE INDEX SERVER HAVING A CORRESPONDING STANDBY INDEX SERVER THAT ACCESSES DATA FROM A CORRESPONDING SECOND SET OF VOLUMES

720 ─
IN RESPONSE TO THE DETECTED FAILURE, UPDATING A NAME TABLE TO REDIRECT FUTURE DATA ACCESS REQUESTS FROM THE FAILED ACTIVE INDEX SERVER TO THE STANDBY INDEX SERVER FOR THE FAILED ACTIVE INDEX SERVER

(56) References Cited

U.S. PATENT DOCUMENTS

| | | | |
|---|---|---|---|
| 10,396,997 B2 | 8/2019 | Brady et al. | |
| 11,436,097 B1 * | 9/2022 | Kumar | G06F 3/0668 |
| 11,947,555 B1 | 4/2024 | Mohideen et al. | |
| 11,966,411 B1 | 4/2024 | Rajgaria et al. | |
| 12,332,754 B2 | 6/2025 | Behrens et al. | |
| 12,332,913 B2 | 6/2025 | Behrens et al. | |
| 2011/0173233 A1 | 7/2011 | Matsumura et al. | |
| 2013/0282666 A1 | 10/2013 | Mcgee et al. | |
| 2015/0046744 A1 * | 2/2015 | Frerking | G06F 11/3055 |
| | | | 714/4.11 |
| 2017/0116232 A1 | 4/2017 | Marwah et al. | |
| 2018/0074915 A1 | 3/2018 | Yang et al. | |
| 2018/0246928 A1 | 8/2018 | Kim et al. | |
| 2018/0336258 A1 | 11/2018 | Lee et al. | |
| 2019/0306236 A1 | 10/2019 | Wiener et al. | |
| 2019/0332269 A1 | 10/2019 | Greenwood et al. | |
| 2019/0349205 A1 | 11/2019 | Brady et al. | |
| 2020/0097556 A1 | 3/2020 | Chen et al. | |
| 2021/0334003 A1 | 10/2021 | Agrawal et al. | |
| 2022/0030062 A1 | 1/2022 | Jennings et al. | |
| 2022/0253363 A1 | 8/2022 | Zhang et al. | |
| 2022/0382742 A1 | 12/2022 | Procek et al. | |
| 2023/0229363 A1 | 7/2023 | Karr et al. | |
| 2023/0229572 A1 * | 7/2023 | Murata | G06F 11/20 |
| | | | 714/4.11 |
| 2024/0069779 A1 | 2/2024 | Nhs et al. | |
| 2024/0126536 A1 | 4/2024 | He et al. | |
| 2024/0256572 A1 | 8/2024 | Toste Gomes et al. | |
| 2025/0045034 A1 | 2/2025 | Behrens et al. | |
| 2025/0045178 A1 | 2/2025 | Behrens et al. | |
| 2025/0045296 A1 | 2/2025 | Behrens et al. | |
| 2025/0045297 A1 | 2/2025 | Behrens et al. | |

OTHER PUBLICATIONS

"SAP HANA System Replication", SAP HANA Platform 2.0 SPS 05. Document version 1.1-2021-07-30, (Jul. 30, 2021), 274 pgs.

"U.S. Appl. No. 18/228,446, Non Final Office Action mailed Aug. 28, 2024", 52 pgs.

"U.S. Appl. No. 18/228,446, Response filed Nov. 19, 2024 to Non Final Office Action mailed Aug. 28, 2024", 12 pgs.

"U.S. Appl. No. 18/228,395, Non Final Office Action mailed Nov. 20, 2024", 12 pgs.

"U.S. Appl. No. 18/228,446, Examiner Interview Summary mailed Nov. 25, 2024", 3 pgs.

"European Application No. 24185975.0 Extended European Search Report mailed on Dec. 4, 2024", 50 pgs.

"U.S. Appl. No. 18/228,446, Final Office Action mailed Dec. 20, 2024", 59 pgs.

"U.S. Appl. No. 18/228,395, Response filed Dec. 31, 2024 to Non Final Office Action mailed Nov. 20, 2024", 12 pgs.

"U.S. Appl. No. 18/228,427, Non Final Office Action mailed Jan. 2, 2025", 9 pgs.

"U.S. Appl. No. 18/228,446, Examiner Interview Summary mailed Feb. 3, 2025", 3 pgs.

"U.S. Appl. No. 18/228,446, Response filed Feb. 20, 2025 to Final Office Action mailed Dec. 20, 2024", 14 pgs.

"U.S. Appl. No. 18/228,395, Notice of Allowance mailed Feb. 26, 2025", 9 pgs.

"U.S. Appl. No. 18/228,427, Response filed Mar. 31, 2025 to Non Final Office Action mailed Jan. 2, 2025", 11 pgs.

"U.S. Appl. No. 18/228,446, Notice of Allowance mailed Apr. 16, 2025", 9 pgs.

"U.S. Appl. No. 18/228,427, Final Office Action mailed Jul. 1, 2025", 10 pgs.

"U.S. Appl. No. 18/228,412, Non Final Office Action mailed Jul. 15, 2025", 9 pgs.

"U.S. Appl. No. 18/228,427, Response filed Oct. 1, 2025 to Final Office Action mailed Jul. 1, 2025", 11 pgs.

"U.S. Appl. No. 18/228,412, Response filed Oct. 9, 2025 to Non Final Office Action mailed Jul. 15, 2025", 10 pgs.

"U.S. Appl. No. 18/228,427, Non Final Office Action mailed Oct. 21, 2025", 13 pgs.

"U.S. Appl. No. 18/228,427, Response filed Jan. 21, 2026 to Non Final Office Action mailed Oct. 21, 2025", 11 pgs.

"U.S. Appl. No. 18/228,412, Notice of Allowance mailed Feb. 2, 2026", 7 pgs.

* cited by examiner

Figure 5:
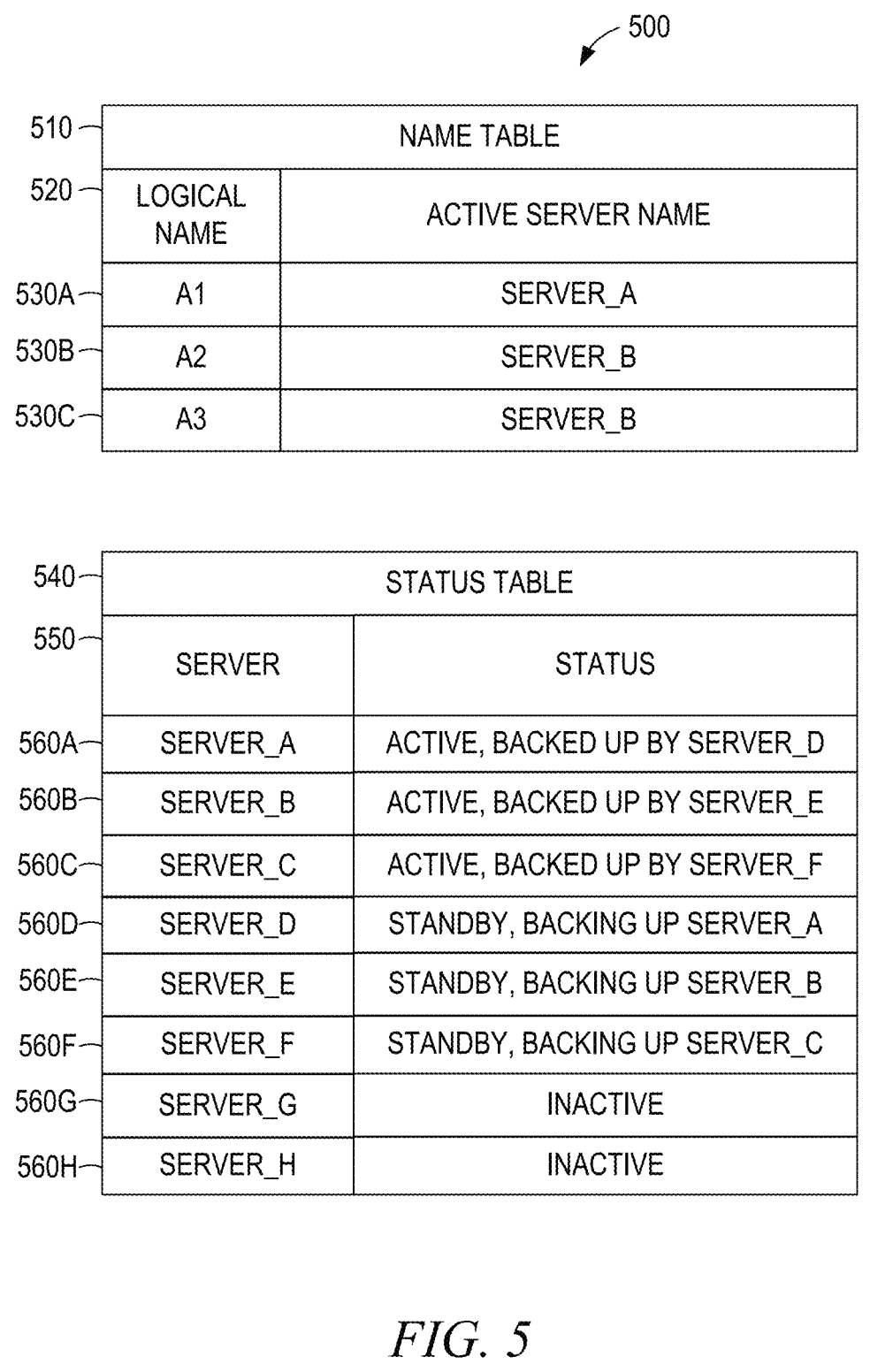

500

| NAME TABLE | |
|---|---|
| LOGICAL NAME | ACTIVE SERVER NAME |
| A1 | SERVER_A |
| A2 | SERVER_B |
| A3 | SERVER_B |

510 — NAME TABLE
520 — LOGICAL NAME / ACTIVE SERVER NAME
530A — A1 / SERVER_A
530B — A2 / SERVER_B
530C — A3 / SERVER_B

| STATUS TABLE | |
|---|---|
| SERVER | STATUS |
| SERVER_A | ACTIVE, BACKED UP BY SERVER_D |
| SERVER_B | ACTIVE, BACKED UP BY SERVER_E |
| SERVER_C | ACTIVE, BACKED UP BY SERVER_F |
| SERVER_D | STANDBY, BACKING UP SERVER_A |
| SERVER_E | STANDBY, BACKING UP SERVER_B |
| SERVER_F | STANDBY, BACKING UP SERVER_C |
| SERVER_G | INACTIVE |
| SERVER_H | INACTIVE |

540 — STATUS TABLE
550 — SERVER / STATUS
560A — SERVER_A / ACTIVE, BACKED UP BY SERVER_D
560B — SERVER_B / ACTIVE, BACKED UP BY SERVER_E
560C — SERVER_C / ACTIVE, BACKED UP BY SERVER_F
560D — SERVER_D / STANDBY, BACKING UP SERVER_A
560E — SERVER_E / STANDBY, BACKING UP SERVER_B
560F — SERVER_F / STANDBY, BACKING UP SERVER_C
560G — SERVER_G / INACTIVE
560H — SERVER_H / INACTIVE

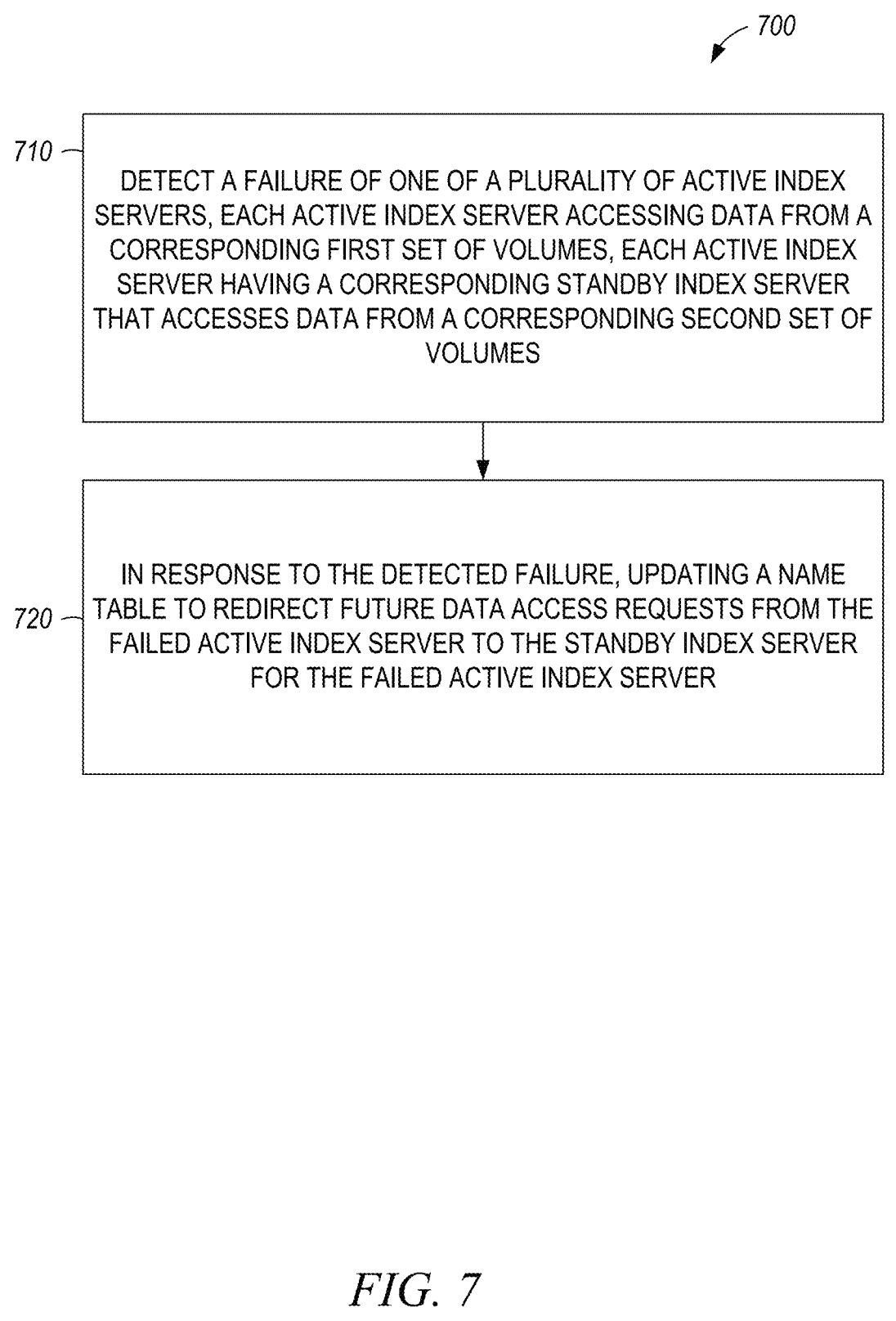

DETECT A FAILURE OF ONE OF A PLURALITY OF ACTIVE INDEX SERVERS, EACH ACTIVE INDEX SERVER ACCESSING DATA FROM A CORRESPONDING FIRST SET OF VOLUMES, EACH ACTIVE INDEX SERVER HAVING A CORRESPONDING STANDBY INDEX SERVER THAT ACCESSES DATA FROM A CORRESPONDING SECOND SET OF VOLUMES

720 —

IN RESPONSE TO THE DETECTED FAILURE, UPDATING A NAME TABLE TO REDIRECT FUTURE DATA ACCESS REQUESTS FROM THE FAILED ACTIVE INDEX SERVER TO THE STANDBY INDEX SERVER FOR THE FAILED ACTIVE INDEX SERVER

*FIG. 7*

INCREASED REPLICATION FOR MANAGED VOLUMES

CROSS-REFERENCE TO RELATED APPLICATIONS

This application is a continuation of prior application Ser. No. 18/228,395, filed on Jul. 31, 2023, which is incorporated by reference herein in its entirety.

TECHNICAL FIELD

The subject matter disclosed herein generally relates to computing clusters comprising multiple computing hosts with storage volumes. Specifically, the present disclosure addresses systems and methods to improve reliability of a computing cluster by increasing replication for managed volumes.

BACKGROUND

Enterprises can use enterprise applications to support and execute operations. Enterprise applications are increasingly deployed in cloud computing environments, which includes execution of the enterprise applications within a data center of a cloud-computing provider (e.g., as part of an infrastructure-as-a-service (IaaS) offering).

A computing cluster providing enterprise application services may comprise several active servers and one standby server. If an active server fails, the standby server becomes an active server in place of the failed server. If another active server fails before a replacement standby server is available, the services provided by the computing cluster degrade or become unavailable.

BRIEF DESCRIPTION OF THE DRAWINGS

FIG. 5 is a block diagram illustrating a database schema, suitable for storing data for use in a system implementing replication for managed volumes, according to some example embodiments.

FIG. 7 is a flowchart illustrating operations of an example method suitable for improving reliability of a computing cluster using replication for managed volumes.

DETAILED DESCRIPTION

Figure 1:
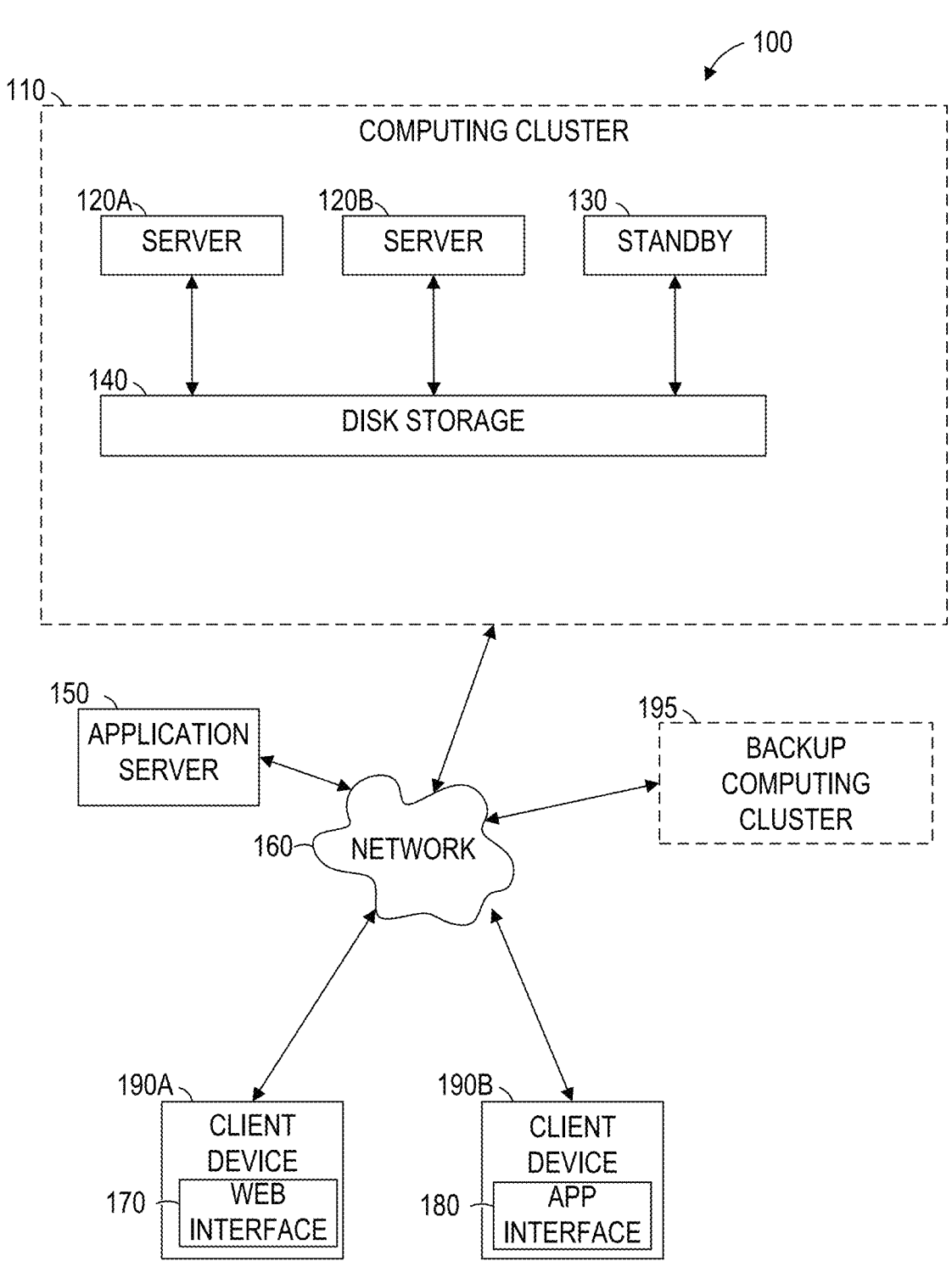
FIG. 1 is a network diagram illustrating an example network environment suitable for a computing cluster.

Example methods and systems are directed to improving reliability of computing clusters by increasing replication for managed volumes. Enterprise data storage needs are large and increasing. Storage solutions may be "scale-up" solutions or "scale-out" solutions. Scale-up solutions involve adding additional storage capacity (e.g., hard drives or solid-state drives) and controllers at the location at which they are used. As more controllers are added, the complexity of accessing desired data increases. Scale-out solutions provide a single interface that hides the details of the underlying hardware. A scale-out computing cluster may include a large number of computing servers and storage devices.

An individual computing server or storage device may have a high reliability (e.g., 0.1% chance of failure per year). Nonetheless, without standby servers or replication, the reliability of a computing cluster as a whole is substantially lower. For example, with 100 components, each of which is 99.9% reliable, the chance that none of them will fail during a year is about 90%. Users of computing clusters often seek reliability of 99.999% or higher. In order to provide the desired reliability, the computing cluster must be able to handle failures of individual devices.

Some computing clusters improve reliability by providing a single standby server for a set of active servers. When one active server fails, the single standby server becomes an active server and takes the place of the failed server. The failed server may be brought back online or replaced. After the failed server resumes service, the (no-longer) failed server may become the new standby server. During the period of time in which the failed server is being repaired or replaced, the computing cluster does not have a standby server. As a result, if a second failure occurs during this period of time, performance of the computing cluster will be affected (e.g., the computing cluster may be unable to provide the functionality usually provided by the second failed server).

Reliability may be further improved by providing a standby server for each active server instead of only one standby server for the computing cluster. If any active server fails, the corresponding standby server is activated. The failed server may be brought back online or replaced, at which time the restored server becomes the standby server for the now-active original standby server. During the restoration period, if any other active server fails, the standby server for that active server is immediately activated. As a result, the recovery ability of the computing cluster is only challenged if both servers of an active/standby pair fail during the restoration period, substantially improving reliability.

The data volumes and log volumes managed by each active server may also be replicated for each standby server. In the event of a storage device failure, as for a server failure, the standby server may immediately begin performing the duties of the active server, accessing the replicated volumes.

Additionally or alternatively, an entire computing cluster may be replicated. For example, if a natural disaster strikes at a first computing cluster, computing may continue at a second computing cluster at a remote location. Using the systems and methods described herein, in which more than one standby server is provided for a computing cluster, reliability is improved over systems that only provide a single standby server.

FIG. 1 is a network diagram illustrating an example network environment 100 suitable for a computing cluster 110. The network environment 100 includes the computing cluster 110, client devices 190A and 190B, an application server 150, a backup computing cluster 195, and a network 160. The application server 150 accesses application data (e.g., application data stored by the computing cluster 110 or the backup computing cluster 195) to provide one or more applications to the client devices 190A and 190B via a web interface 170 or an application interface 180.

The computing cluster 110 comprises active servers 120A and 120B and standby server 130. The servers 120A, 120B, and 130 access data (e.g., read and write data) of the disk storage 140. If one of the active servers 120A-120B fails, the standby server 130 becomes active and replicates the functionality of the failed active server. The backup computing cluster 195 comprises additional servers and disk storage and replicates the functionality of the computing cluster 110. If the computing cluster 110 fails (e.g., due to failure of multiple servers 120A-120B or due to natural disaster that disconnects the computing cluster 110 from the network 160), data access requests from the application server 150 may be routed to the backup computing cluster 195 to allow the application server 150 to continue to provide the one or more applications to the client devices 190A and 190B.

The servers 120A-120B and 130, the application server 150, and the client devices 190A and 190B may each be implemented in a computer system, in whole or in part, as described below with respect to FIG. 9. The client devices 190A and 190B may be referred to collectively as client devices 190 or generically as a client device 190.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 150, the computing cluster 110, the backup computing cluster 195, and the client devices 190A-190B are connected by the network 160. The network 160 may be any network that enables communication between or among machines, databases, and devices. Accordingly, the network 160 may be a wired network, a wireless network (e.g., a mobile or cellular network), or any suitable combination thereof. The network 160 may include one or more portions that constitute a private network, a public network (e.g., the Internet), or any suitable combination thereof.

Though FIG. 1 shows only one or two of each element (e.g., one application server 150, one computing cluster 110, two active servers 120A-120B, and the like), any number of each element is contemplated. For example, the computing cluster 110 may include dozens or hundreds of active and standby servers and provide data to multiple application servers that provide applications to millions of client devices. Likewise, each application server may access data from multiple computing clusters, each client device may access applications from multiple application servers, and so on.

Figure 2:
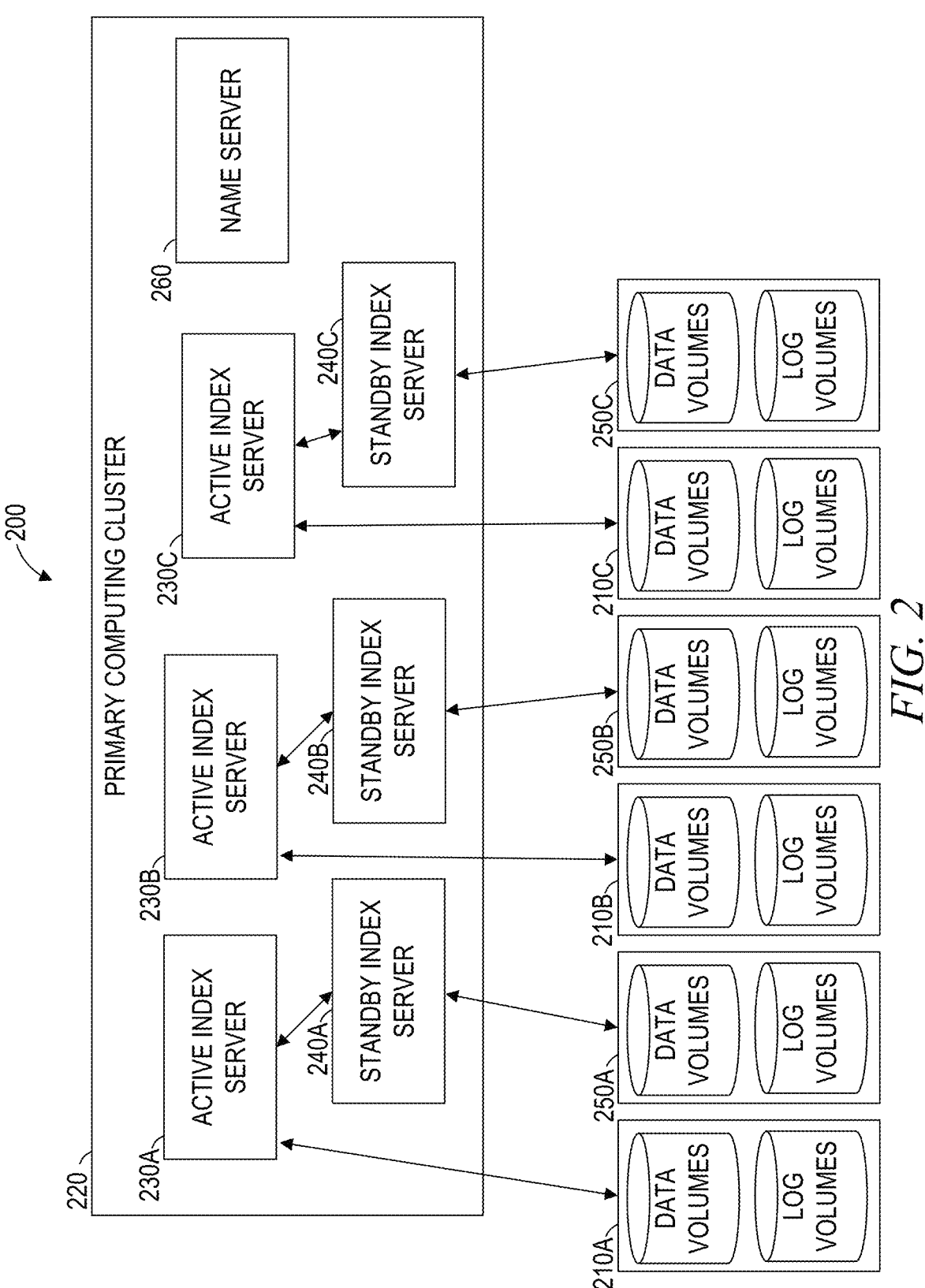
FIG. 2 is a block diagram of a computing cluster, showing relationships between servers and storage volumes, according to some example embodiments.

FIG. 2 is a block diagram 200 of a primary computing cluster 220, showing relationships between active index servers 230A, 230B, 230C; standby index servers 240A, 240B, and 240C; a name server 260; and storage volumes 210A, 210B, 210C, 250A, 250B, and 250C, according to some example embodiments. The active index servers 230A, 230B, and 230C access data stored in the storage volumes 210A, 210B, and 210C, respectively. Data access requests (e.g., data reads or writes) or other commands processed by each of the active index servers 230A-230C are forwarded to the corresponding standby index servers 240A, 240C, and 240C. Data in the storage volumes 210A-210C, controlled by the active index servers 230A-230C, is duplicated in the storage volumes 250A-250C, controlled by the standby index servers 240A-240C.

Using the setup shown in FIG. 1, with a single standby server 130 for multiple active servers 120A-120B, if a second server fails, no standby server will be available. As a result, performance of the computing cluster 110 will suffer. By contrast, if multiple active index servers 230A-230C fail, the operations performed by each one can immediately be performed by the corresponding standby index server 240A, 240B, or 240C. Accordingly, the primary computing cluster 220 is more reliable than the computing cluster 110.

The name server 260 stores a name table that maps logical server names to the active index servers 230A-230C. If one of the active index servers 230A-230C fails, the name server 260 updates the name table so that the logical server name previously mapped to the failed active index server becomes mapped to the corresponding one of the standby index servers 240A-240C. As a result of updating the name table, future data access requests directed to the logical server name will be directed to the now-active standby index server.

Figure 3:
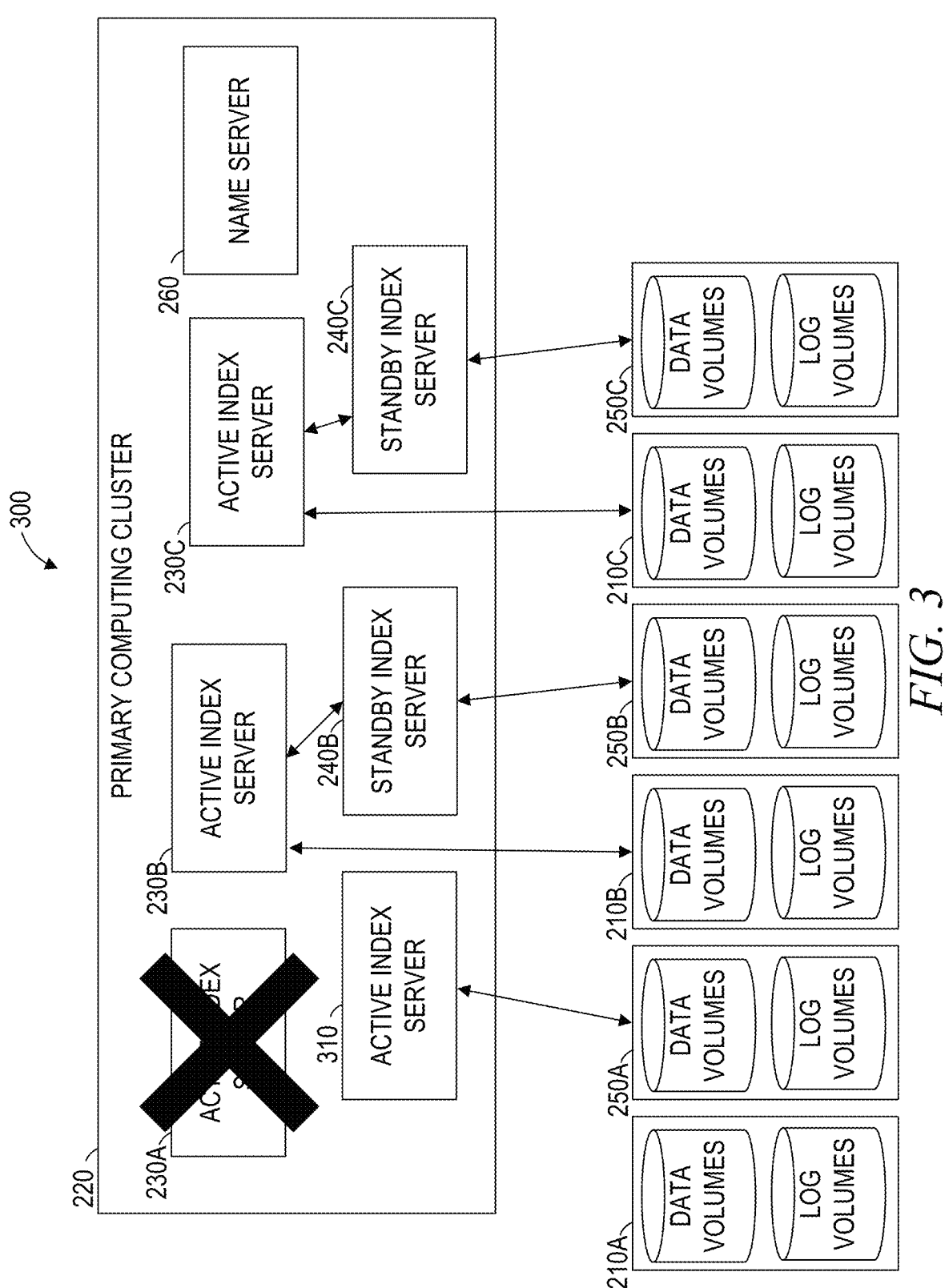
FIG. 3 is a block diagram of the computing cluster of FIG. 2, showing a failure of an active index server, according to some example embodiments.

FIG. 3 is a block diagram 300 of the primary computing cluster 220 of FIG. 2, showing a failure of the active index servers 230A, according to some example embodiments. In response to detecting the failure of the active index servers 230A, the name server 260 updates the name table so that standby index server 240A becomes an active server (labeled as active index server 310). Data access requests that previously were handled by the active index servers 230A are now handled by the active index server 310. Since the data in the storage volumes 210A is replicated in the storage volumes 250A, the results obtained by the host/container index server using the storage volumes 250A are the same as the results that would have been obtained by the active index servers 230A using the storage volumes 210A. The standby index servers 240B and 240C remain available in the event that the active index server 230B or 230C fails.

Figure 4:
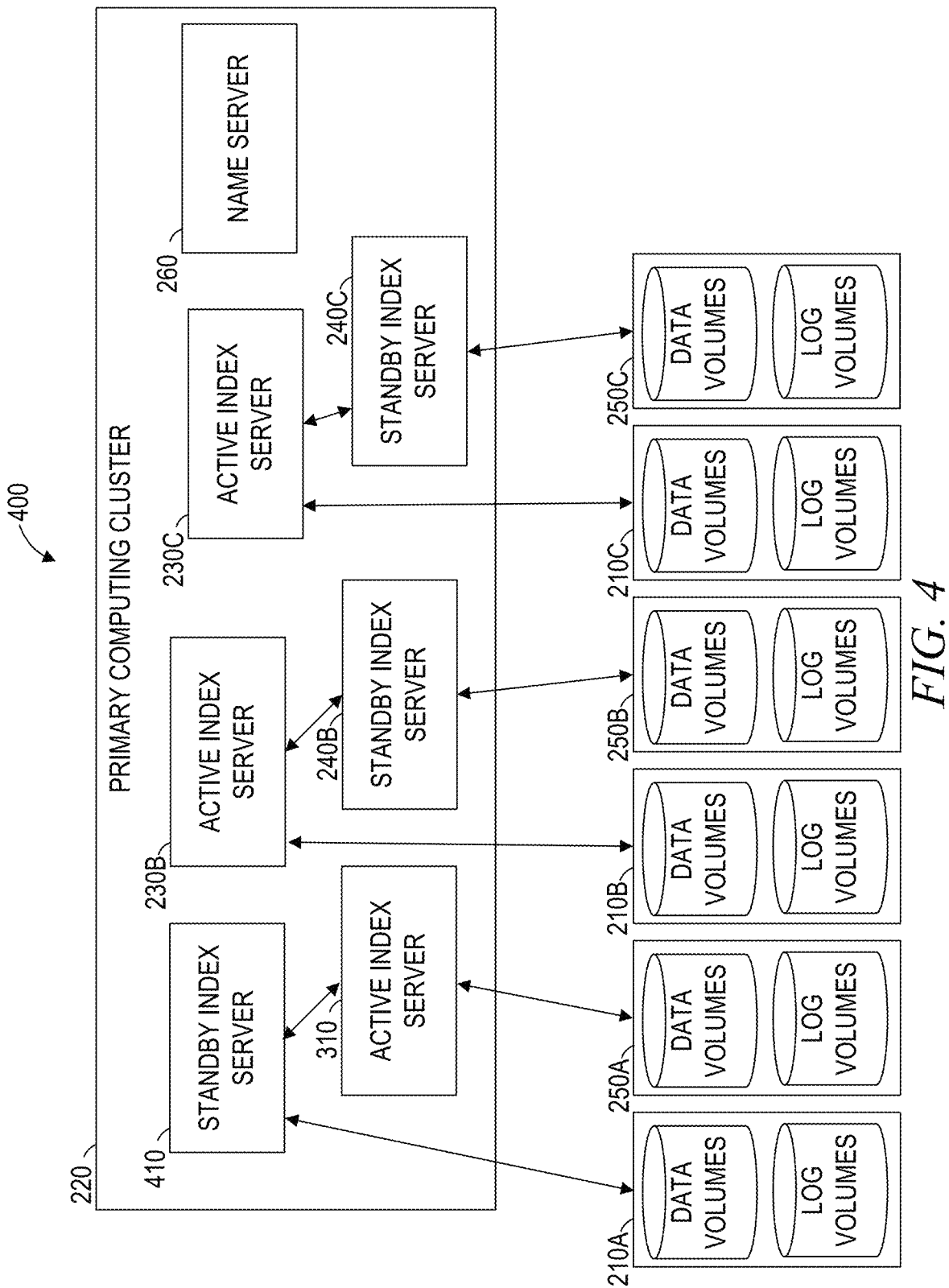
FIG. 4 is a block diagram of the computing cluster of FIGS. 2-3, showing reassignment of two servers active/standby status, according to some example embodiments.

FIG. 4 is a block diagram of the computing cluster of FIGS. 2-3, showing reassignment of two servers active/standby status, according to some example embodiments. As discussed above with respect to FIG. 3, the active index server 310 is an active server, using the storage volumes 250A, after the active index servers 230A fails. When the failed server is restored to service or replaced, the server becomes a standby index server (shown as standby index server 410). Data access requests that are processed by the active index server 310 are replicated by the standby index server 410 using the storage volumes 210A. If the active index server 310 fails, the standby index server 410 will be able to resume service as an active index server.

During the process of starting the standby index server 410, any data access requests processed by the active index server 310 during the period in which no standby index server was available are processed by the standby index server 410. Thus, the data volumes and log volumes of the storage volumes 210A are re-synchronized with the data volumes and log volumes of the storage volumes 250A.

In the examples of FIGS. 2-4, each active index server 230A-230C has a single standby index server 240A-240C that is ready to immediately become active in the event of failure of one of the active index servers 230A-230C. In other example embodiments, multiple standby index servers are present for each active index server. For example, each active index server may have two standby index servers. Each standby index server replicates the operations of its corresponding active index server using a separate set of storage volumes. In the event that an active index server fails, one of its standby index servers becomes active. In the event that the now-active standby index server fails, the other standby index server becomes active. The additional backup index servers and storage volumes further increase the reliability of the primary computing cluster 220. Thus, the name server 260 may, in response to detecting a failure of a standby index server for the failed active index server, update a name table to direct future access requests from the standby index server for the failed active index server to a second standby index server for the failed active index server.

FIG. 5 is a block diagram illustrating a database schema 500, suitable for storing data for using in a system implementing replication for managed volumes, according to some example embodiments. The database schema 500 includes a name table 510 and a status table 540. The name table 510 includes rows 530A, 530B, and 530C of a format 520. The status table 540 includes rows 560A, 560B, 560C, 560D, 560E, 560F, 560G, and 560H of a format 550.

Each row of the name table 510 contains an active server name for a logical name. When a communication is received that is addressed to a logical name, the name server 260 of FIGS. 2-4 looks up the active server based on the logical name. The communication is routed to the identified server. If an active server fails, the name server 260 may update the name table 510 to re-route communications to the corresponding standby server. Additional columns may be included in the name table 510, such as an Internet protocol (IP) address of the active server.

The format 550 of the status table 540 indicates that each of the rows 560A-560H identifies a server and the status of that server. For example, the row 560A indicates that the server SERVER_A is an active server and that the corresponding standby server is SERVER_D. Likewise, the row 560D indicates that the server SERVER_D is a standby server and the corresponding active server is SERVER_A. Thus, if SERVER_A fails, the name server 260 can quickly identify SERVER_D as the standby server, using the row 560A and update the name table 510 and the status table 540 to indicate that SERVER_D is active. Instead, if SERVER_E were to fail, the name server 260 would determine that SERVER_E was a standby server and that, while SERVER_E is down, SERVER_B has no standby server. Accordingly, another available server (such as SERVER_G, with a status of "inactive," shown in the row 560G) may be assigned to be the standby server for SERVER_D.

Though the database schema 500 shows only a few tables and only a few rows, any number of tables and rows are contemplated. For example, the name table 510 and the status table 540 may store data for dozens, hundreds, or thousands of servers.

Figure 6:
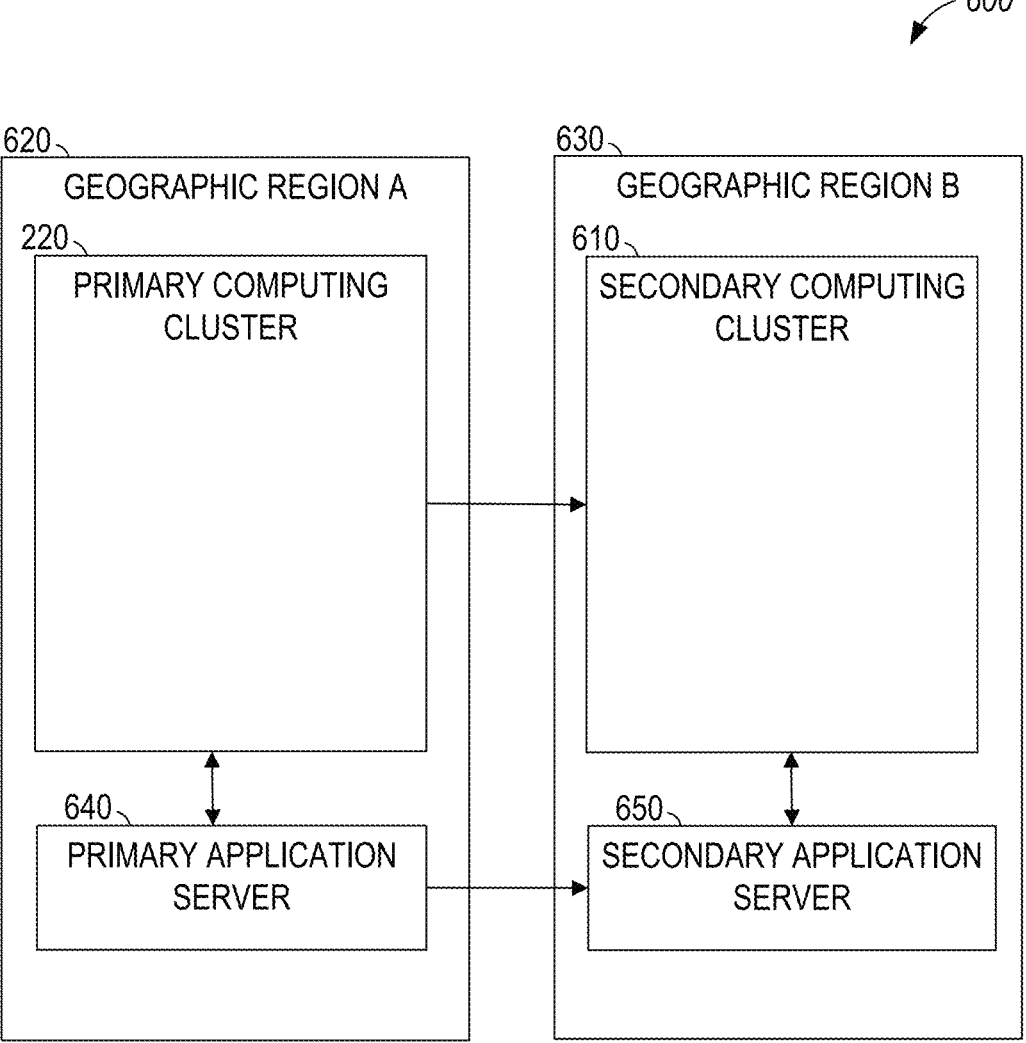
FIG. 6 is a block diagram showing a transfer of services from one computing cluster to another, in the event of failure of the computing cluster of FIGS. 2-4, according to some example embodiments.

FIG. 6 is a block diagram showing a transfer of services from one computing cluster to another, in the event of failure of the primary computing cluster 220 of FIGS. 2-4, according to some example embodiments. The primary computing cluster 220 is located in a first geographic region 620 (e.g., a first city, country, state, or continent) and a secondary computing cluster 610 is located in a second geographic region 630. After determining that the primary computing cluster 220 has failed, data access requests directed to the primary computing cluster 220 are redirected to the secondary computing cluster 610.

The secondary computing cluster 610 may include servers and storage volumes similar to those of the primary computing cluster 220. The transfer of services may be facilitated by the use of a name server. For example, the primary computing cluster 220 may be addressed using a name, which is converted by a name server into an Internet Protocol (IP) address to route a data access request to. When the primary computing cluster 220 fails, the name server updates a mapping table so that communications addressed to the name are routed to the secondary computing cluster 610. The secondary computing cluster 610 may comprise a plurality of active index servers, each active index server of the second plurality of the secondary computing cluster 610 replicating a corresponding one of the active index servers 230A-230C of the primary computing cluster 220.

In the example of FIGS. 2-4, the name server 260 is shown as part of the primary computing cluster 220. In other example embodiments, the name server 260 is duplicated in multiple computing clusters or exists outside of any computing cluster. The name server 260 may be configured to, in response to detecting that the primary computing cluster 220 is unavailable, update the name table 510 to direct future access requests from the primary computing cluster 220 in the geographic region 620 to the secondary computing cluster in a different geographic region 630 (e.g., a different city, state, country, or continent).

A primary application server 640 hosts an application that accesses data (or uses other resources) of the primary computing cluster 220. To reduce latency, it may be desirable for an application to run on an application server located in the same geographic region as the computing cluster providing data access. Accordingly, if the primary computing cluster 220 fails and the secondary computing cluster 610, in the different geographic region 630, begins handling data access requests for an application hosted by the primary application server 640, the application may be transferred to a secondary application server 650 in the same geographic region 630 as the secondary computing cluster 610. After the application is transferred to the secondary application server 650, the application accesses data (or uses other resources) by communicating within the geographic region 630 with the secondary computing cluster 610.

FIG. 7 is a flowchart illustrating operations of an example method 700 suitable for improving reliability of a computing cluster using replication for managed volumes. The method 700 includes operations 710 and 720. By way of example and not limitation, the method 600 may be performed by the name server 260 of the computing cluster 210 of FIGS. 2-4.

In operation 710, the name server 260 of FIG. 2 detects a failure of one of a plurality of active index servers. Each of the active index servers accesses data from a corresponding first set of volumes. Each of the active index servers has a corresponding standby index server that accesses data from a corresponding second set of volumes. With reference to FIG. 2, each of the active index servers 230A-230C accesses data from a corresponding first set of volumes, 210A-210C. Each of the active index servers 230A-230C has a corresponding standby index server, one of the standby index servers 240A-240C. Each of the standby index servers 240A-240C accesses data from a different corresponding set of volumes, one of the sets of storage volumes 250A-250C.

In response to the detected failure, the name server, in operation 720, updates a name table to redirect future data access requests from the failed active index server to the standby index server for the failed active index server. For example, the name table may initially direct data requests for "server A" to the active index server 230A, requests for "server B" to the active index server 230B, and requests for "server C" to the active index server 230B. In response to detecting that the active index server 230A has failed, the name table is updated to direct requests for "server A" to the standby index server 240A.

The operations 710-720 may be repeated for the failure of a second active index server, or even for the failure of all of the active index servers. Since the system provides a corresponding standby index server for each active index server, multiple failures do not result in a situation in which an active index server fails and no standby index server is available to replace it.

After operation 720, the name server 260 may detect the resumption of service of the active index server that was detected as failing in operation 710. In response to the detecting of the resumption of service, the name server 260 may update the status table 540 of FIG. 5 to assign the formerly active index server as the standby index server for the standby index server that was made active in operation 720.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: a plurality of active index servers, each active index server accessing data from a corresponding first set of data volumes; a standby index server for each of the plurality of active index servers, each standby index server accessing data from a corresponding second set of data volumes; and a name server configured to perform operations comprising: detecting a failure of any of the plurality of active index servers; and in response to the detected failure, updating a name table to redirect future data access requests from the failed active index server to the standby index server for the failed active index server.

In Example 2, the subject matter of Example 1, wherein each of the plurality of active index servers are configured to perform operations comprising: receiving data access requests; in response to each of the data access requests: accessing data from the corresponding first set of data volumes; and forwarding the data access request to the standby index server for the active index server.

In Example 3, the subject matter of Examples 1-2, wherein the name server is further configured to perform operations comprising: detecting a resumption of service of the failed active index server; and in response to the detected resumption of service, updating a name table to use the failed active index server as a standby index server.

In Example 4, the subject matter of Examples 1-3 includes a second standby index server for each of the plurality of active index servers, each second standby index server accessing data from a corresponding third set of data volumes; wherein the name server is further configured to perform operations comprising: in response to detecting a failure of the standby index server for the failed active index server, updating the name table to direct future access requests from the standby index server for the failed active index server to the second standby index server for the failed active index server.

In Example 5, the subject matter of Examples 1-4, wherein: the plurality of active index servers and the standby index servers are part of a first computing cluster; and the name server is further configured to perform operations comprising: in response to detecting that the first computing cluster is unavailable, updating the name table to direct future access requests from the first computing cluster to a second computing cluster in a different geographic region.

In Example 6, the subject matter of Example 5, wherein the second computing cluster comprises a second plurality of active index servers, each active index server of the second plurality of active index servers replicating a corresponding active index server of the plurality of active index servers.

In Example 7, the subject matter of Examples 5-6 includes a first application server co-located with the first computing cluster; and a second application server co-located with the second computing cluster; wherein an application is configured to transfer execution from the first application server to the second application server in response to detecting that the name table was updated to direct future access requests to the second computing cluster.

Example 8 is a non-transitory computer-readable medium that stores instructions that, when executed by one or more processors, cause the one or more processors to perform operations comprising: detecting a failure of one a plurality of active index servers, each active index server accessing data from a corresponding first set of data volumes, each active index server having a corresponding standby index server that access data from a corresponding second set of data volumes; in response to the detected failure, updating a name table to redirect future data access requests from the failed active index server to the standby index server for the failed active index server.

In Example 9, the subject matter of Example 8, wherein the operations further comprise: detecting a resumption of service of the failed active index server; and in response to the detected resumption of service, updating a name table to use the failed active index server as a standby index server.

In Example 10, the subject matter of Examples 8-9, wherein the operations further comprise: in response to detecting a failure of the standby index server for the failed active index server, updating the name table to direct future access requests from the standby index server for the failed active index server to a second standby index server for the failed active index server.

In Example 11, the subject matter of Examples 8-10, wherein the operations further comprise: in response to detecting that a first computing cluster comprising the plurality of active index servers is unavailable, updating the name table to direct future access requests from the first computing cluster to a second computing cluster in a different geographic region.

In Example 12, the subject matter of Example 11, wherein the second computing cluster comprises a second plurality of active index servers, each active index server of the second plurality of active index servers replicating a corresponding active index server of the plurality of active index servers.

Example 13 is a method comprising: detecting, by one or more processors, a failure of one a plurality of active index servers, each active index server accessing data from a corresponding first set of data volumes, each active index server having a corresponding standby index server that access data from a corresponding second set of data volumes; in response to the detected failure, updating a name table to redirect future data access requests from the failed active index server to the standby index server for the failed active index server.

In Example 14, the subject matter of Example 13 includes detecting a resumption of service of the failed active index server; and in response to the detected resumption of service, updating a name table to use the failed active index server as a standby index server.

In Example 15, the subject matter of Examples 13-14 includes, in response to detecting a failure of the standby index server for the failed active index server, updating the name table to direct future access requests from the standby index server for the failed active index server to a second standby index server for the failed active index server.

In Example 16, the subject matter of Examples 13-15 includes, in response to detecting that a first computing cluster comprising the plurality of active index servers is unavailable, updating the name table to direct future access requests from the first computing cluster to a second computing cluster in a different geographic region.

In Example 17, the subject matter of Example 16, wherein the second computing cluster comprises a second plurality of active index servers, each active index server of the second plurality of active index servers replicating a corresponding active index server of the plurality of active index servers.

In Example 18, the subject matter of Examples 16-17 includes transferring execution of an application from a first application server co-located with the first computing cluster to a second application server co-located with the second computing cluster in response to detecting that the name table was updated to direct future access requests to the second computing cluster.

In Example 19, the subject matter of Examples 13-18 includes receiving, by the plurality of active index servers, data access requests; and in response to each of the data access requests: accessing data from the corresponding first set of data volumes; and forwarding the data access request to the standby index server for the active index servers.

In Example 20, the subject matter of Examples 13-19, wherein the standby index servers are synchronous standbys for the active index servers.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 8:
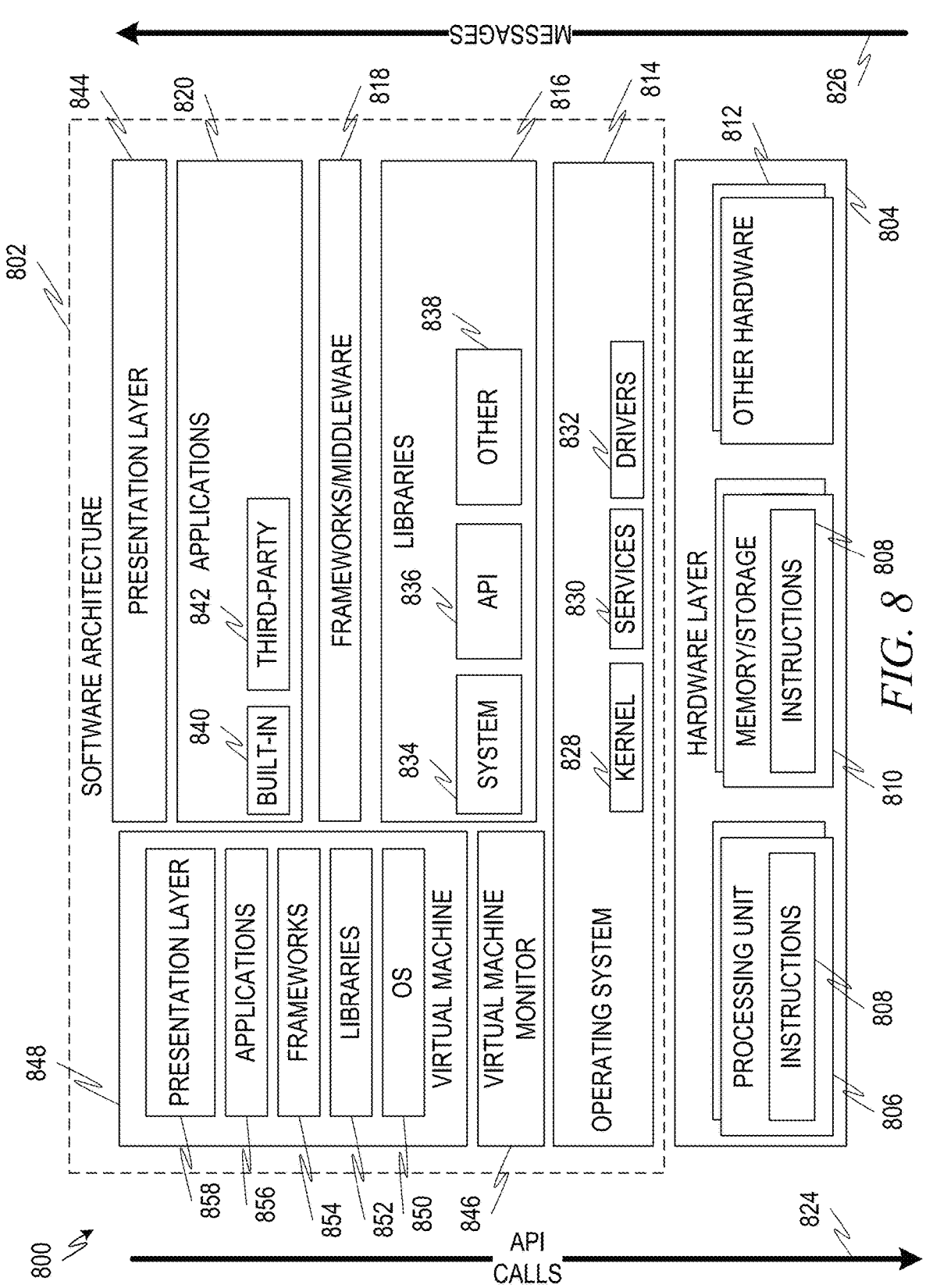
FIG. 8 is a block diagram showing one example of a software architecture for a computing device.

FIG. 8 is a block diagram 800 showing one example of a software architecture 802 for a computing device. The software architecture 802 may be used in conjunction with various hardware architectures, for example, as described herein. FIG. 8 is merely a non-limiting example of a software architecture, and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system of FIG. 9.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812 which represents any other hardware of the hardware layer 804, such as the other hardware illustrated as part of the software architecture 802.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and presentation layer 844. Operationally, the applications 820 and/or other components within the layers may invoke application programming interface (API) calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware 818 layer, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the software architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware 818 may provide a higher-level common infrastructure that may be utilized by the applications 820 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any of the built-in applications as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built in operating system functions (e.g., kernel 828, services 830 and/or drivers 832), libraries (e.g., system libraries 834, API libraries 836, and other libraries 838), frameworks/middleware 818 to create user interfaces to interact with users of the system. Alternatively, or additionally, in some systems, interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine 848 as well as the interface with the host operating system (i.e., operating system 814). A software architecture executes within the virtual machine 848 such as an operating system 850, libraries 852, frameworks/middleware 854, applications 856 and/or presentation layer 858. These layers of software architecture executing within the virtual machine 848 can be the same as corresponding layers previously described or may be different.

Modules, Components and Logic

A computer system may include logic, components, modules, mechanisms, or any suitable combination thereof.

Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 9:
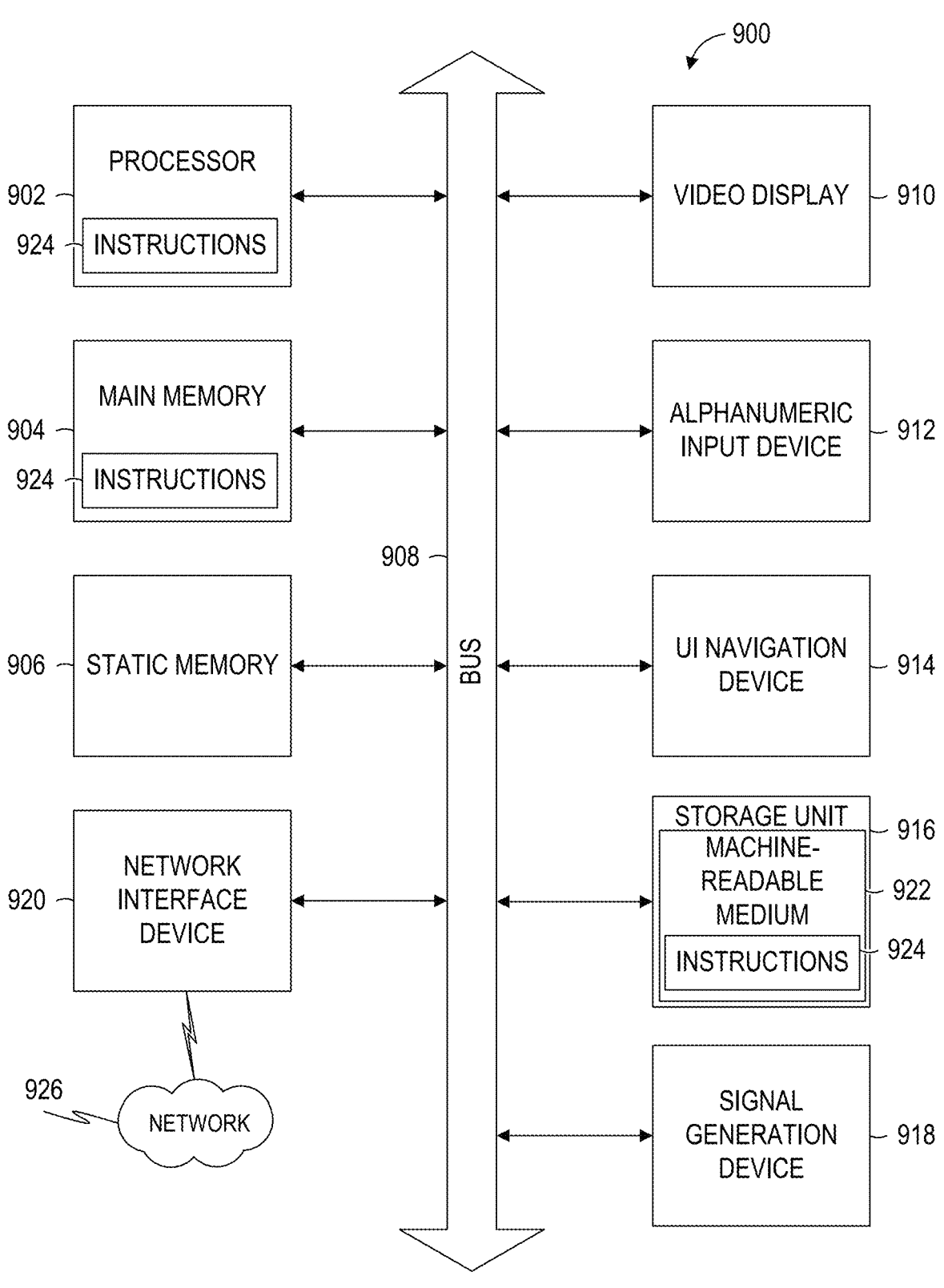
FIG. 9 is a block diagram of a machine in the example form of a computer system within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation (or cursor control) device 914 (e.g., a mouse), a storage unit 916, a signal generation device 918 (e.g., a speaker), and a network interface device 920.

Machine-Readable Medium

The storage unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media 922.

While the machine-readable medium 922 is shown in FIG. 9 to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 924 may further be transmitted or received over a communications network 926 using a transmission medium. The instructions 924 may be transmitted using the network interface device 920 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A system comprising:
   a first application server located in a first geographic region, the first application server hosting an application;
   a standby index server located in a second geographic region different from the first geographic region; and
   a second application server located in the second geographic region;
   wherein the application:
      detects that a name table was updated to direct future access requests to the standby index server in the second geographic region; and
      in response to the detecting that the name table was updated to direct future access requests to the standby index server, transfers execution of itself from the first application server to the second application server.

2. The system of claim 1, wherein after the application is transferred to the second application server, the application accesses data by communicating within the second geographic region with the standby index server.

3. The system of claim 1, further comprising an active index server located in the first geographic region, the active index server being configured to perform operations comprising:
   in response to receiving a data access request:
      accessing data from a corresponding first set of data volumes; and
      forwarding the data access request to the standby index server.

4. The system of claim 3, further comprising:
   a second standby index server for the active index server; and
   a name server that is configured to perform operations comprising:
      in response to detecting a failure of the standby index server, updating the name table to direct future access requests from the standby index server to the second standby index server.

5. The system of claim 3, wherein the standby index server accesses data from a corresponding second set of data volumes.

6. The system of claim 1, further comprising a name server configured to perform operations comprising:
   detecting a failure of an active index server; and
   in response to the detected failure, updating the name table to redirect future data requests from the active index server to the standby index server.

7. The system of claim 6, wherein the standby index server is a synchronous standby for the active index server.

8. The system of claim 1, wherein the first geographic region comprises a first country and the second geographic region comprises a second country.

9. A non-transitory computer-readable medium that stores instructions that, when executed by one or more processors, cause the one or more processors to perform operations comprising:

detecting, by an application executing in a first geographic region, that a name table was updated to direct future access requests to an index server located in a second geographic region different from the first geographic region; and in response to the detecting that the name table was updated to direct future access requests to the index server, transferring execution of the application to an application server located in the second geographic region.

10. The non-transitory computer-readable medium of claim 9, wherein after the application is transferred to the application server, the application accesses data by communicating within the second geographic region with the index server.

11. The non-transitory computer-readable medium of claim 9, wherein, prior to transferring execution of the application to the application server located in the second geographic region, the application sends data access requests to an active index server located in the first geographic region.

12. The non-transitory computer-readable medium of claim 9, wherein the index server is a synchronous standby for an active index server.

13. The non-transitory computer-readable medium of claim 9, wherein the first geographic region comprises a first country and the second geographic region comprises a second country.

14. A method comprising:

hosting an application at a first application server in a first geographic region;

detecting, by the application, that a name table was updated to direct future access requests to a standby index server located in a second geographic region different from the first geographic region; and in response to the detecting that the name table was updated to direct future access requests to the standby index server, transferring execution of the application from the first application server to a second application server in the second geographic region.

15. The method of claim 14, wherein after the application is transferred to the second application server, the application accesses data by communicating within the second geographic region with the standby index server.

16. The method of claim 14, further comprising:

in response to receiving, by an active index server located in the first geographic region, a data access request:

accessing, by the active index server, data from a corresponding first set of data volumes; and forwarding the data access request from the active index server to the standby index server.

17. The method of claim 16, further comprising:

in response to detecting a failure of the standby index server, updating, by a name server, the name table to direct future access requests from the standby index server to a second standby index server for the active index server.

18. The method of claim 16, wherein the standby index server accesses data from a corresponding second set of data volumes.

19. The method of claim 14, further comprising:

detecting, by a name server, a failure of an active index server; and in response to the detected failure, updating, by the name server, the name table to redirect future data requests from the active index server to the standby index server.

20. The method of claim 14, wherein the first geographic region comprises a first country and the second geographic region comprises a second country.

* * * * *